United States Patent

[11] 3,549,790

| [72] | Inventor | Karl F. Reed II |
| | | Birmingham, Ala. |
| [21] | Appl. No. | 810,952 |
| [22] | Filed | Mar. 27, 1969 |
| [45] | Patented | Dec. 22, 1970 |
| [73] | Assignee | Anderson Electric Corporation |
| | | Leeds, Ala. |
| | | a corporation of Alabama |

[54] STRAIN INSULATOR
6 Claims, 6 Drawing Figs.

[52] U.S. Cl. ...................................................... 174/177,
174/199; 287/124
[51] Int. Cl. ......................................................... H01b 17/02,
H01b 17/38
[50] Field of Search ........................................... 174/G.F.,
140.1, 176, 177, 178, 179, 199, 207; 287/20.3, 82,
124; 306/33

[56] References Cited
UNITED STATES PATENTS

| 105,834 | 7/1870 | Oakman ........................ | 174/199 |
| 3,129,282 | 4/1964 | Flynn ............................ | 174/177 |

*Primary Examiner*—Laramie E. Askin
*Attorney*—Koenig, Senninger, Powers and Leavitt ABSTRACT: An insulator wherein the rod has a kerf in the end and the attachment member has a socket portion, part cylindrical and part tapered, for receiving the rod. The tapered portion has a cross section having two straight parallel sides connected to one another by two semicircular end portions. The radius of each semicircle substantially corresponds to that of the end portion of the rod and the length of each of the straight sides substantially corresponds to the thickness at that point of a wedge to be positioned therein. A wedge is engaged in the kerf so as to be in contact with the straight sides and separating and flaring out the portions of the rod on opposite sides of the kerf substantially completely engaging the surface of the tapered portion of the cavity.

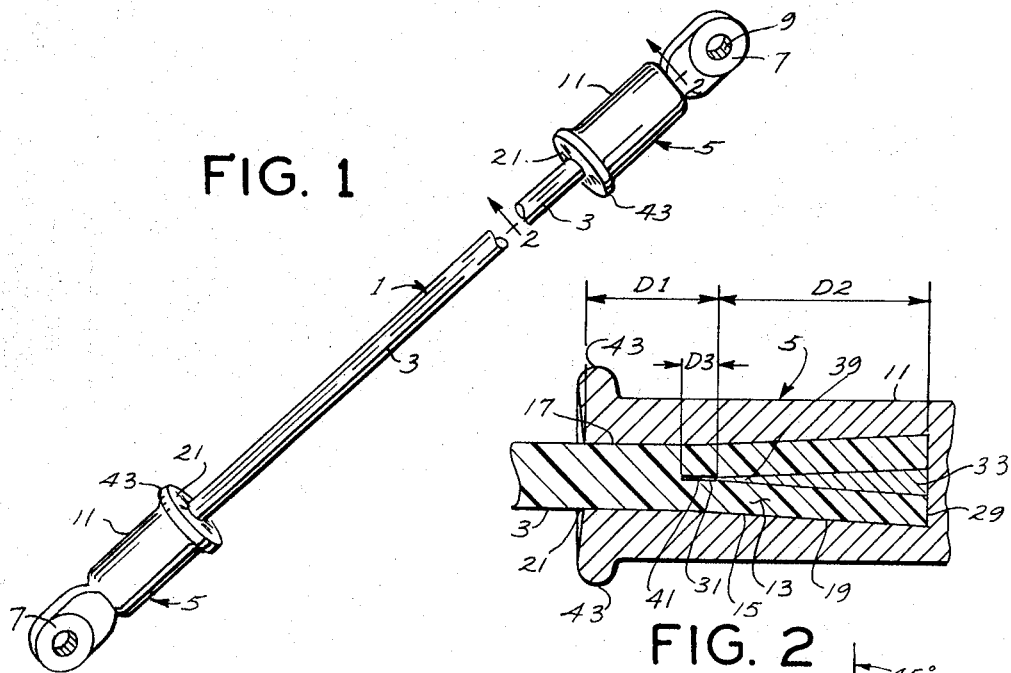

STRAIN INSULATOR

BACKGROUND OF THE INVENTION

This invention relates to insulators and more particularly to strain insulators for use in the electrical utility industry as, for example, insulator linkages in guy wires for high-voltage transmission line poles where elongate resin-impregnated dielectric fiber rods are anchored to end attachment fittings.

Resin-impregnated dielectric fiber rods with appropriate end attachment fittings are now in widespread use as the insulating member in strain insulators for guying utility poles. The dielectric rod material typically is fiber glass rod which is formed of longitudinally arranged glass fibers bonded together by suitable resins, such as polyesters, epoxy, melamine, phenol, et cetera. Such rod has high dielectric strength, can withstand great stresses, has a very high strength-weight ratio, is dimensionally stable, has excellent weathering characteristics, is highly resistant to most chemicals and is mildew- and rot-proof. There has been great difficulty, however, in securely anchoring the end portions of such fiber glass rods to end attachment fittings so that the strain insulator thus formed will retain its integrity under the high tensile forces it must withstand during use without splitting, weakening or actually creeping, et cetera. The most substantial problem involved in fabricating strain insulators of this type is that fiber glass rod is highly susceptible to splitting. Numerous approaches have been made in the past to anchoring the end of the fiber glass rod in the end fittings, including using conical socket cavities and enlarging the rod end by forming an unreinforced cured resin body with the socket, as well as using wedges engaged in split rod ends. These various prior systems have tended to be less than optimum under service conditions.

Perhaps the most successful of the prior art systems is that shown in coassigned U.S. Pat. 3,129,282 upon which the instant invention is an improvement. According to that patent, an end fitting is used which has a conico-cylindrical cavity for the fiber glass rod which is circular in cross section. The rod ends are sawed and a wedge inserted to provide resistance to slipping as the rod and wedge are pulled forward against the conical portion of the cavity wall. The cavity is filled with epoxy to fill the voids therein and bond the whole assembly together. This system, although generally satisfactory, has been found to have certain undesirable features. The epoxy resin will occasionally experience incomplete cure and subsequently can actually act as a lubricant, making it possible for the fitting to slip or possibly pull apart entirely at very low axial tensile loads. It is desirable that the end fittings be in alignment with one another. This requires special fixtures or jigs. Further, it has been found that under extreme tension conditions there is a tendency for the distal portion of the fitting to deform or neck in on a diameter aligned with the wedge width, or for the wedge itself to flatten.

SUMMARY OF THE INVENTION

Among the several objects of this invention is the provision of strain insulators in which fiber glass rods are anchored to end attachment fittings with improved holding power and without effecting fracturing or splitting of the rod; the provision of insulators of this type which are physically rugged, have excellent electrical characteristics, are economical to produce and are dependable under all types of service conditions; the provision of insulators which are sealed against water penetration and the fiber glass rod component is protected from damage by flashovers; and the provision of insulators which are fabricated by a simple, convenient and reliable method and the end fittings are automatically aligned with one another without the use of special fixtures or jigs.

Briefly, an insulator of this invention comprises a rod of dielectric material with the end portion of the rod having a kerf extending inwardly from the end of the rod along a longitudinal diametrical plane of the rod. An attachment member is provided which has a socket portion for receiving and holding an end portion of the rod. The socket portion has a cavity with a first cylindrical portion extending inwardly into the socket from the mouth thereof for a first distance. The socket cavity also has a second inwardly diverging tapered portion extending for a second distance from the inner end of the first cylindrical portion and having at any transverse plane therethrough a cross section which has two straight parallel sides connected to one another by two semicircular end portions. The radius of each semicircle substantially corresponds to the radius of the cross section of the end portion of the rod and the length of each of the straight sides corresponds substantially to the thickness at that point of a wedge to be positioned therein. The diameter of the cylindrical portion of the socket is substantially equal to that of the end portion of the rod. A wedge is engaged in the kerf so as to be substantially in contact with the straight sides of the second portion of the cavity and separating and flaring out the portion of the rod on opposite sides of the kerf. This results in the formation of an enlarged end portion of the rod which substantially completely engages the surfaces of the semicircular ends of the second portion of the cavity. The wedge has a taper angle not less than that of the semicircular ends of the second portion of the cavity.

Frequently the attachment member will have a fitting having an opening for receiving a fastener such as a bolt at the end thereof opposite the socket. When this is so, the axis of the opening desirably is at an angle of about 45° from the axis drawn through the centers of the two semicircular end portions of the tapered portion of the cavity.

It is also desirable that the mouth of the socket portion be concave so that a rim is provided on the socket end of the attachment member peripherally spaced away from the outer surfaces of the rod. Other objects and features will be in part apparent and in part pointed out hereinafter.

BRIEF DESCRIPTION OF THE DRAWINGS

In the accompanying drawings, one of various possible embodiments of the invention is illustrated:

FIG. 1 is a perspective view of a strain insulator according to the instant invention;

FIG. 2 is a fragmentary longitudinal section taken on line 2-2 of FIG. 1;

FIG. 3 is a view of an end fitting of the type used in the insulator shown in FIG. 1;

FIG. 4 is a cross section taken on line 4-4 of FIG. 3;

FIG. 5 is a cross section taken on line 5-5 of FIG. 3; and

FIG. 6 is a cross section taken on line 6-6 of FIG. 3.

Corresponding reference characters indicate corresponding parts throughout the several views of the drawings.

DESCRIPTION OF THE PREFERRED EMBODIMENT

Referring now to the drawings, and with particular reference to FIGS. 1 and 2, an insulator of the present invention designated in its entirety by reference numeral 1 is shown to comprise an elongate rod 3 of a resin-impregnated dielectric material, such as fiber glass, and two end attachment members or fittings 5 secured to opposite ends thereof. Each of these exemplary-type end fittings 5 includes an eye portion 7 having an opening 9 for receiving an elongate fastener such as a pin or a bolt which may be secured to the end of a guy wire, and a socket portion 11 for receiving an end portion 13 of rod 3. Fittings 5 are preferably formed of a strong metal or metallic alloy such as cast aluminum or cast ductile iron. Each socket portion 11 has a cavity 15 with a cylindrical first portion 17 extending inwardly into the socket from its mouth 21 for a first distance as indicated by D1. The cavity 15 in socket portion 11 has a second inwardly diverging tapered portion 19 extending inwardly for a second distance from the inner end of the first cylindrical portion, as indicated by D2, and having at any transverse plane therethrough a cross section having two straight parallel sides 23 connected to one another by two semicircular end portions 25 (see FIGS. 4 and 5). The radius of each semicircle 25 substantially corresponds to the radius of the cross section of the end portion 13 of rod 3. These two portions 17 and 19 intersect and join at 27, which junction is a circle which may be referred to as a tapered takeoff circle. The socket cavity 15 terminates in a seat 29 which precludes entry of moisture from the rear. The socket cavity 15 can also be open-ended and subsequently closed and sealed in any appropriate manner as by plugging.

The end portion 13 of rod 3 is axially slotted or cut on a centerline to provide a kerf 31 extending inwardly from the end of the rod along a longitudinal diametrical plane thereof for a distance preferably greater than the length of second portion 19 of cavity 15, i.e., D2, but less than the sum of D1 and D2. Engaged in kerf 31 is a wedge 33. The straight sides 23 of the second portion 19 of cavity 15 have a length which corresponds at any given point about to the thickness of the wedge 33 at that point. Wedge 33, which is preferably made of a metallic material such as aluminum or iron, separates and flares out portions 35 and 37 of rod end 13 on opposite sides of the kerf 31 to form an enlarged rod end engaging the semicircular end portions of second portion 19 of cavity 15 in socket 11. Wedge 33 has a taper angle which is equal to or preferably slightly greater than that of the semicircular end portions 25 of the second portion 19 of cavity 15. That is, the included angles of the semicircular end portion 25 and wedge 33 are approximately equal and preferably the latter is somewhat greater. Although the wedge taper angle may vary considerably, it may, for example, be about 4° to 6°, in which event the taper of 25 should be not greater than about 6° and should be somewhat less. The length of the wedge 33 is desirably, but not necessarily, less than that of the kerf 31 and substantially equal to distance D2. Thus, the entering end 39 of the wedge 33 is spaced from the inner end of the kerf 31 to form an opening 41. The length of this opening is indicated at D3.

The wedge 33 may have roughened surfaces if desired to increase its grip upon portions 35 and 37 of rod end 13. The thickness of wedge 33 adjacent to its entering end 39 is approximately equal to that of the kerf 31. As the diameter of rod 3 is substantially equal to that of the two semicircular ends 25, and as the wedge's entering end (exclusive of the usual wedge knife edge) thickness at the distance D2 from the socket 11 is approximately equal to that of the kerf, the outer surfaces of rod end 13 at the taper takeoff circle 27 are firmly pressed radially outward against the socket cavity at this circle of junction of the two portions 17 and 19 of the cavity. This is particularly shown in FIG. 6. The width of the wedge as indicated in FIGS. 4 and 5 is preferably substantially equal to the diameter of rod 3. The various sections shown in FIGS. 4, 5 and 6 illustrate this assembly.

It will be noted that the face portion or mouth 21 of the socket is concave and thereby provides a rim 43 on the socket end which is peripherally spaced away from the outer surfaces of the rod. This is an advantageous feature as frequently flashovers will occur between strain insulator end fittings. As the closest distance between the end fittings is between the rims 43, this flashover will not strike or terminate at a joint where the mouth and rod 3 joint. This structural arrangement therefore protects the rod from flashovers by confining them to a path away from the rod surfaces.

With reference now to FIGS. 3, 4, 5 and 6, is can be seen that each end fitting or attachment member has a fitting such as eye 7 having an opening 9 for receiving a fastener such as a bolt at the end thereof opposite the socket portion. As shown, the axis of the opening 9 desirably is at an angle of approximately 45° from the axis drawn through the centers of the two semicircular end portions 25 of the tapered portion 19 of the cavity 15. Since the kerf at each end of the rod is desirably formed along longitudinal diametrical planes at 90° to one another, this automatically insures the proper alignment of the end fittings without the use of special fixtures or jigs when the strain insulator is being assembled and minimizes any tendency of the rod to split. It further eliminates any necessity for left- and right-hand fittings and one pattern can be made for a fitting suitable for use at either end of the rod.

To fabricate the insulator of the instant invention, the end portion 13 of rod 3 is anchored in the cavity 15 as follows:

After the rod end 13 is slotted or sawed to form kerf 31, wedge 33 is lightly or initially engaged with its entering end 39 introduced into the kerf 31 at the rod end. The cavity, rod end portions, wedge and kerf may be coated with a fluid uncured epoxy or other suitable synthetic resin, if desired, although the tight fit of the assembly according to the instant invention eliminates or substantially reduces the need for such a resin coating. The rod-wedge assembly is then inserted into the socket portion with sufficient pressure to force the rod end and wedge base against socket seat 29. During this action, the rod end portions or arms 35 and 37 separate and are spread outwardly toward the surface of the semicircular end portions of the second portion 19 of cavity 15. The wedge is substantially in contact with the straight sides 23 of the second portion 19 of cavity 15. Thus, the arms 35 and 37 flex or cantilever about the taper takeoff circle 27, but any further outward movement of the rod end in this area is prevented. This action, in conjunction with the unoccupied opening 41, if present, fills the important function of eliminating any splitting of the rod, or at the least, restricts any such tendency to a minute crack of very short length. Thus, the rod arms 35 and 37, because of this arrangement, are permitted advantageous flexing action and freedom as rod end approaches socket seat 29, where upon contact the wedge's entering edge is restrained from further movement toward the inner end of the kerf and as the wedge is substantially in contact with the straight sides 23 of the second portion of cavity 15, there is no built-in stress tending to make the rod split. Tension is then applied between the end fittings 5 and rod 3 which more firmly seats the separated end portions and wedge relative to the cavity surfaces and the kerf, thereby forming a uniform seal between the mating or contacting surfaces thereof. If a resin material has been used, it is cured to form a permanent bond between the assembled components, either before or during tensioning.

The noncircular cross section of the second portion of the cavity with the tight fit of the various parts improves the resistance to damage from torque or twisting of the assembly. It also provides proper alignment of the end fittings and eliminates or substantially reduces the need for epoxy in the cavity.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An insulator comprising:
    a rod of dielectric material, the end portion of the rod having a kerf extending inwardly from the end of the rod along a longitudinal diametrical plane of the rod;
    an attachment member having a socket portion for receiving and holding an end portion of the rod, the socket portion having a cavity with a first cylindrical portion extending inwardly into the socket portion from the mouth thereof for a first distance and a second portion extending inwardly for a second distance from the inner end of said first cylindrical portion, said second portion having a width throughout its length which is substantially constant as measured in a first diametrical plane corresponding to the plane of the kerf, said width being substantially equal to the diameter of said cylindrical portion, said second portion being tapered in a second plane at right angles to said first plane and diverging as it progresses inwardly from the inner end of said cylindrical portion, said second portion having at any transverse plane therethrough a cross section having two straight parallel sides connected to one another by two opposed semicircular portions with said sides tangent to said semicircular portions and spaced a distance equal to the diameter of said semicircular portions, the radius of each semicircular portion substantially corresponding to the radius of the cross section of the end portion of the rod and the transverse dimension of each of the straight sides at any cross section of said member corresponding to the thickness at that point of a wedge to be positioned therein, the diameter of the cylindrical portion being substantially equal to that of the end portion of the rod; and a wedge engaged in the kerf so as to be in contact with the straight sides of the second portion of the cavity and separating and flaring out the portions of the rod on opposite sides of the kerf thereby forming an enlarged end portion of the rod substantially completely engaging the surfaces of said semicircular portions of the second portion of the cavity, the wedge having a taper angle not less than the taper angle of the second portion of the cavity.

2. The insulator of claim 1 wherein the mouth of the socket portion is concave and thereby provides a rim on the socket end of the attachment member peripherally spaced away from the outer surfaces of the rod.

3. The insulator of claim 1 wherein the kerf extending inwardly from the end of the rod has a length greater than the second distance.

4. The insulator of claim 1 wherein the entering edge of the wedge is spaced from the inner end of the kerf.

5. The insulator of claim 1 wherein each end portion of the rod has a kerf extending inwardly from the end of the rod along a longitudinal diametrical plane of the rod and the planes are at 90° to one another.

6. The insulator of claim 5 wherein the attachment member has a fitting having an opening for receiving a fastener at the end thereof opposite the socket portion and the axis of the opening is at an angle of about 45° from the axis drawn through the centers of the two semicircular portions of the second portion of the cavity.

PO-1050
(5/69)

UNITED STATES PATENT OFFICE
CERTIFICATE OF CORRECTION

Patent No. 3,549,790                Dated December 22, 1970

Inventor(s)   Karl F. Reed II

It is certified that error appears in the above-identified patent and that said Letters Patent are hereby corrected as shown below:

On the title page of the patent "a corporation of Alabama" should read --a corporation of Nevada--.

Signed and sealed this 8th day of June 1971.

(SEAL)
Attest:

EDWARD M. FLETCHER, JR.                WILLIAM E. SCHUYLER, JR.
Attesting Officer                      Commissioner of Patents